United States Patent
Ivanchenko (10) Patent No.: US 9,530,208 B1
(45) Date of Patent: *Dec. 27, 2016

(54) REGISTRATION OF LOW CONTRAST IMAGES

(71) Applicant: Amazon Technologies, Inc., Reno, NV (US)

(72) Inventor: Volodymyr V. Ivanchenko, Mountain View, CA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/996,125

(22) Filed: Jan. 14, 2016

Related U.S. Application Data (63) Continuation of application No. 13/198,054, filed on Aug. 4, 2011, now Pat. No. 9,251,562.

(51) Int. Cl.
| | |
|---|---|
| H04N 13/02 | (2006.01) |
| G06T 7/00 | (2006.01) |
| G06T 7/20 | (2006.01) |
| G06T 15/10 | (2011.01) |
| H04N 5/247 | (2006.01) |

(52) U.S. Cl.
CPC ......... *G06T 7/0038* (2013.01); *G06T 7/0026* (2013.01); *G06T 7/0028* (2013.01); *G06T 7/2033* (2013.01); *G06T 15/10* (2013.01); *H04N 5/247* (2013.01); *H04N 13/0203* (2013.01); *G06T 2207/10021* (2013.01)

(58) Field of Classification Search
None
See application file for complete search history.

(56) References Cited

U.S. PATENT DOCUMENTS

| | | | |
|---|---|---|---|
| 5,517,419 A * | 5/1996 | Lanckton | G01C 11/02 348/148 |
| 5,661,518 A | 8/1997 | Palm et al. | |
| 6,402,707 B1 | 6/2002 | Ernst | |
| 9,251,562 B1 | 2/2016 | Ivanchenko | |
| 2003/0072483 A1* | 4/2003 | Chen | G06K 9/32 382/154 |
| 2005/0117215 A1 | 6/2005 | Lange | |
| 2006/0251319 A1 | 11/2006 | Franich et al. | |
| 2007/0279415 A1 | 12/2007 | Sullivan et al. | |
| 2010/0020074 A1 | 1/2010 | Taborowski et al. | |

(Continued)

*Primary Examiner* — David H Chu
(74) *Attorney, Agent, or Firm* — Polsinelli LLP (57) ABSTRACT

The registration of images captured at multiple locations, for purposes such as location mapping, can be improved by utilizing multiple image capture elements pointing in at least two different directions or having different viewable ranges. At least one primary image is captured at each location. If the primary image is not able to be correlated with at least one other image based on one or more matching features, image information captured by at least one other camera at substantially the same times as those images can be analyzed to attempt to determine a change in position and/or orientation of the device between those times, which can assist in correlating the primary images. In some embodiments, motion or orientation determining elements can assist in the determination of device movement, and in at least some embodiments can reduce the amount of image information to be processed for a match.

20 Claims, 7 Drawing Sheets

(56) References Cited

U.S. PATENT DOCUMENTS

| | | | |
|---|---|---|---|
| 2010/0142798 A1* | 6/2010 | Weston | G01B 11/007 382/141 |
| 2010/0179420 A1 | 7/2010 | Ernst | |
| 2011/0074916 A1 | 3/2011 | Demirdjian | |
| 2011/0102553 A1 | 5/2011 | Corcoran et al. | |
| 2011/0141227 A1 | 6/2011 | Bigioi et al. | |
| 2012/0120072 A1 | 5/2012 | Se et al. | |
| 2012/0127275 A1 | 5/2012 | Von Zitzewitz et al. | |
| 2012/0148145 A1 | 6/2012 | Liu et al. | |
| 2012/0275688 A1 | 11/2012 | Stainlay et al. | |
| 2013/0010081 A1 | 1/2013 | Tenney et al. | |
| 2013/0064454 A1 | 3/2013 | Endo et al. | |
| 2014/0267614 A1* | 9/2014 | Ding | H04N 13/0275 348/46 |

\* cited by examiner

REGISTRATION OF LOW CONTRAST IMAGES

CROSS-REFERENCE TO RELATED APPLICATIONS

This application is a continuation of U.S. patent application Ser. No. 13/198,054, filed on Aug. 4, 2011, the content of which is incorporated herein by reference.

BACKGROUND

People are utilizing portable computing devices for an increasing number and variety of tasks. One such task involves mapping a location such as the inside of a home or office utilizing such a portable device. When mapping the inside of a dwelling, for example, a user might utilize a portable computing device (such as a smart phone or tablet computer) to take multiple images of the interior of the dwelling. An application on the device then attempts to stitch together the images such that if a user is viewing a three-dimensional representation of the interior of the dwelling, the representation will not appear as a set of discrete images but rather a single continuous image representing the interior of the dwelling. In order to stitch the images together, there must be some way to relate images of adjacent regions of the interior. For example, the location of a doorway in one image can be used to determine the relative overlap between two images if that door also appears in the other image. In many cases, however, there will be images showing substantially blank walls, regions with repetitive patterns, or other such features that do not lend themselves to registration, as there maybe no features that can be correlated with an acceptable level of confidence. Further, since the user capturing the images will generally be holding the portable computing device in the user's hand and walking around to take the images, there generally will be no precise way to determine the location and direction in which the camera was facing when the image was captured.

BRIEF DESCRIPTION OF THE DRAWINGS

Various embodiments in accordance with the present disclosure will be described with reference to the drawings, in which:

FIG. 8 illustrates an example computing device with side imaging elements that can be used in accordance with various embodiments;

FIG. 9 illustrates an example situation wherein a computing device concurrently captures image information using multiple imaging elements in accordance with various embodiments;

FIGS. 10(a) and (b) illustrate example images showing correlatable features in images captured by side cameras of a computing device in accordance with various embodiments;

DETAILED DESCRIPTION

Systems and methods in accordance with various embodiments of the present disclosure may overcome one or more of the aforementioned and other deficiencies experienced in conventional approaches to location mapping and/or image registration. In particular, images captured by an electronic device such as a portable computing device can be registered and/or stitched together even when there are no distinguishable features in overlapping images that enable those images to be registered with a minimum level of confidence. For example, there might not be enough texture or pattering in the images, or a camera sensor might be saturated and not able to capture specific features at each location. In at least some embodiments, additional images can be captured in one or more directions that enable a change in relative orientation of the device to be determined between successive image captures. In other embodiments, position and/or orientation determining elements are able to be used to assist with the registration process, even when those elements may not be accurate enough to be used alone to determine changes in device orientation.

In one embodiment, an optic flow can be analyzed that is provided by secondary image capture elements, such as cameras on the sides or edges of a computing device used to supplement the information captured by at least one primary registration capture element. The primary capture element will typically be a high resolution camera with a relatively narrow field of view that is aligned with time of flight, structured light, or LIDAR detection for mapping applications. The secondary cameras, on the other hand, can be lower resolution elements with wider fields of view that are able to point in any appropriate direction. The secondary cameras can assist not only in registering difficult images, such as images in close proximity to a uniformly colored wall or carpet, but can also help to register scenes in which one or more objects are moving, such as through robust scene feature mapping or by analyzing layered motion. Additional benefits can be obtained since the calculations used for determining device motion through secondary camera image analysis are similar to matching for stereo imaging, but rely on space instead of time. The use of the secondary camera information can also be used to increase the robustness of a stereo system for applications such as image registration and three-dimensional reconstruction. Various other approaches can be used as well within the scope of the various embodiments.

Figure 1:
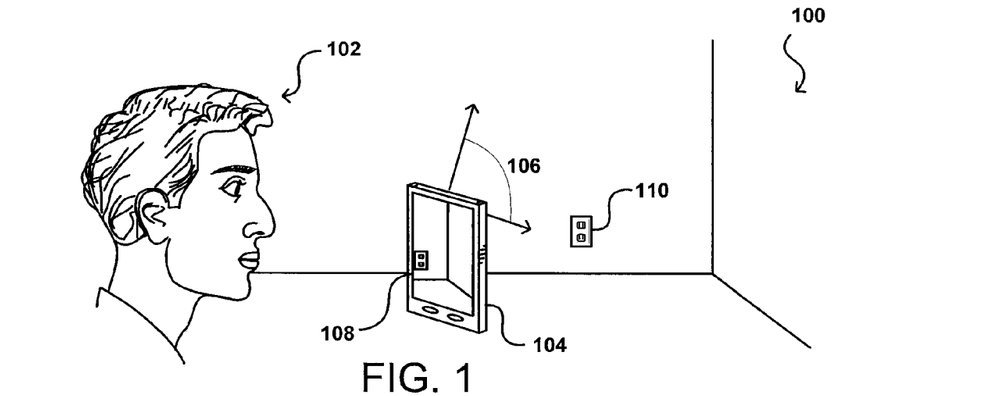
FIG. 1 illustrates an example situation wherein a user is attempting to map the interior of a building in accordance with one embodiment.

FIG. 1 illustrates an example situation 100 wherein a user 102 is operating a computing device 104 to capture a set of images representing the interior of a building. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one image capture element with an associated capture range 106 that is operable to perform functions such as image and/or video capture. Each image capture element may be, for example, a camera, a charge-coupled device (CCD), a motion detection sensor, or an infrared sensor, or can utilize another appropriate image capturing technology. In this example, there is a single camera on a "back" of the device (opposite the display screen 108) but it should be understood that there can be additional or fewer cameras in similar or alternative locations in accordance with the various embodiments.

In this example, the user 102 is holding the computing device 104 such that the imaging element on the back of the device is able to capture an image of a specific region of the interior of the building. In this example, the user is able to see what is being captured on a display screen 108 of the device, which can display the image in real time, upon image capture, or at other such times as known or used in the art. The user might be performing image capture for a simultaneous localization and mapping (SLAM) application, whereby the application will attempt to generate a three-dimensional map using the captured image information, along with position, location, and/or direction information associated with each image. If the user wants to map a room, for example, the user can move the device in increments such that each region of the walls of the room is represented in at least one captured image. As discussed above, each adjacent image can include at least a portion of the same region, such that adjacent images partially overlap to enable those images to be stitched together into a larger and/or continuous image. A user can perform the image capture using any suitable approach, such as standing in a single location and rotating to capture different regions, moving along the walls to capture the various regions, etc. Although not shown in this example, the device also can include at least one distance measuring component, such as a time of flight transceiver, structured light detector, or LIDAR detection element, operable to determine an approximate distance to an object in a captured image for use in determining an approximate location of that object.

Figure 2A:
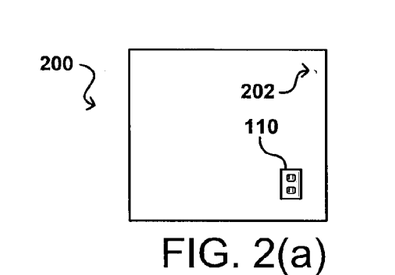
FIGS. 2(a) and (b) illustrate example images wherein one or more features can be used to register images in accordance with various embodiments.
Figure 2B:
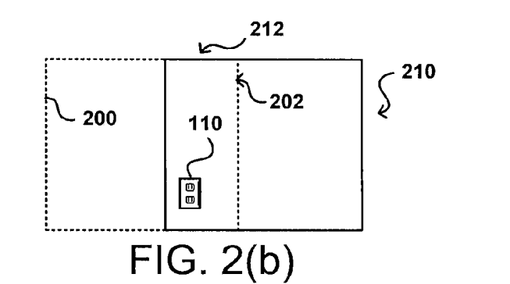

FIG. 2(a) illustrates an example first image 200 of a region of a wall that can be captured in accordance with various embodiments. In this image 200 can be seen the outlet 110 visible in FIG. 1 and at least one other distinguishable or relatively unique feature 202, such as a nail hole, bump, scuff, mark, or other such feature on (or in) that region of the wall. FIG. 2(b) illustrates another image 210 captured of a region near the region of FIG. 2(a). In this example, both the outlet 110 and the distinct feature 202 can be seen in the second image 210. Accordingly, an algorithm executing on the device (or a system or service in communication with the device) can register the images together by aligning the first image 200 and the second image 210 such that the distinguishable features essentially line up in an overlap region 212 of the images. It should be understood that the appearance of such a feature might vary slightly between images due to changes in angle, distance, lighting, or other such aspects, and that any image processing technique can be used to minimize the differences as known or used in the art for such purposes. By being able to "register" these images using distinguishable features in each image, those images can be stitched together or at least stored with location or position information enabling those images to be correlated with respect to each other.

Figure 3A:
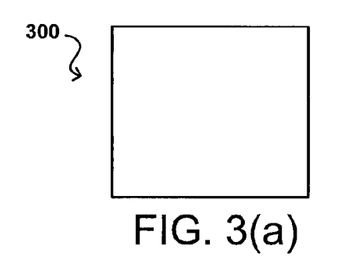
FIGS. 3(a) and (b) illustrate example images where there are no distinct or unique features that can be utilized for registrations in accordance with various embodiments.
Figure 3B:
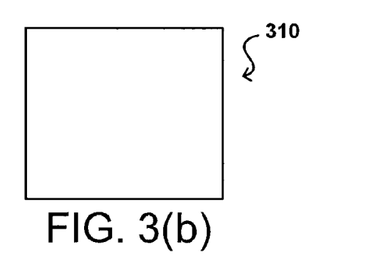
Figure 4A:
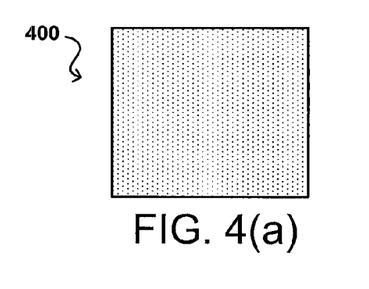
FIGS. 4(a) and (b) illustrate example images where there are no distinct or unique features that can be utilized for registrations in accordance with various embodiments.
Figure 4B:
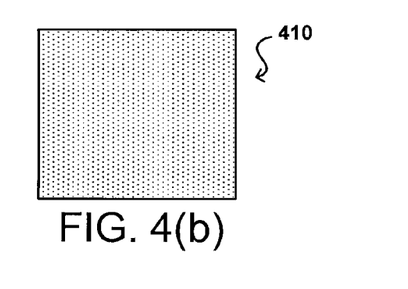

FIG. 3(a), however, illustrates an image 300 captured of a region of a wall that contains no adequately distinguishable feature, at least within a confidence level of a mapping algorithm as may be based on a resolution of the captured image. Such an image can correspond to an region of a wall that is blank or is painted a solid color, has little texturing, etc. FIG. 3(b) illustrates a second image 310 captured for a nearby region of the same wall. As should be apparent, it can be difficult without any additional information to attempt to determine whether these images overlap, and if so by how much and in which direction, as there are no features that can be used to correlate the regions in each image. FIGS. 4(a) and (b) illustrate a similar situation. In this case, there are many features in each captured image 400, 410, but because the features repeat with similar size, shape, and separation it can still be difficult to attempt to register the images.

Figure 5:
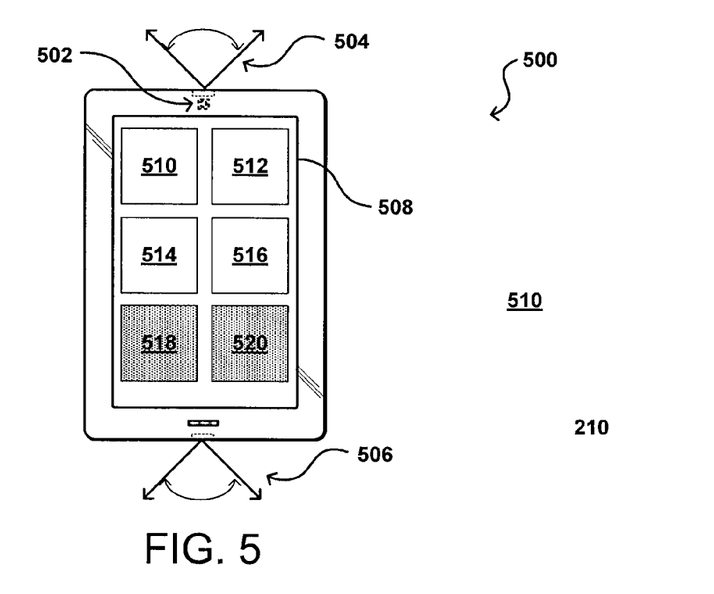
FIG. 5 illustrates an example computing device with top and bottom imaging elements that can be used in accordance with various embodiments.

FIG. 5 illustrates an example of a computing device 500 that can overcome at least some of these and other deficiencies when attempting to register images or perform other functionality as discussed herein. In this example, the computing device again includes a primary image capture element 502, such as a "high resolution" camera operable to capture at least digital still images over a given capture range. In this example, however, the device also includes an image capture element 504 on a "top" edge of the device and an image capture element 506 on a "bottom" edge of the device. It should be understood that terms such as "top" and "bottom" are used for purposes of convenience to describe a possible orientation when a computing device is held or positioned in a certain manner, and is not meant to require specific orientation or positioning of components in all embodiments. It also should be understood that there might be only a top camera or a bottom camera used with the primary camera in some embodiments, and that other combinations are possible as well.

In this example, each imaging element can capture image information concurrently, at least while in a mapping mode or similar state, such that when the primary image capture element 502 captures an image of a region to be mapped, the top and bottom elements also capture images while the device is in that orientation. In FIG. 5, images captured using each of the three cameras are displayed on a display screen 508 of the device. In this example, the images 510, 514, 518 on the left represent images captured at a previous location, and the images 512, 516, 520 displayed on the right can be the most recently captured set of images and/or real-time displays indicating what can be captured at the current orientation. Such information can help the user and/or device to determine whether there are overlapping features distinguishable in a pair of images captured by at least one of the cameras, such that the image information can be registered. In some embodiments, the display element might provide a notification (e.g., flash, change in color, sound, etc.) when features in at least one pair of images can be correlated, such that the user knows it is acceptable to capture image information at that location. In some embodiments, there might be a maximum amount of allowable overlap before the device will notify the user of the appropriateness of the current location, etc.

Figure 6A:
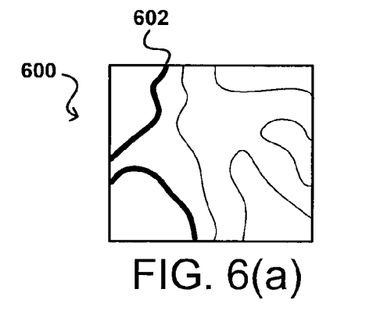
FIGS. 6(a) and (b) illustrate example images showing correlatable features in images captured of carpet that can be used to correlate mapping images in accordance with various embodiments.
Figure 6B:
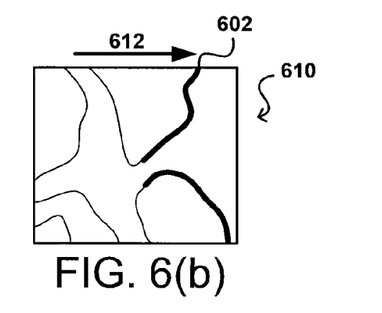

In this particular example, the images 514, 516 captured by the primary camera and the images 510, 512 captured by the top camera do not contain any distinguishable features. The images 518, 520 captured by the bottom camera, however, include a pattern that can be easily correlated between images. For example, FIG. 6(a) illustrates a captured image 600 showing a portion of a pattern, as may correspond to a carpet or marble pattern, etc. FIG. 6(b) illustrates a second image 610 showing a second view of the pattern, where at least a portion of the pattern 602 (represented by the thicker line segments) is viewable in both images. An image analysis and/or pattern matching algorithm can determine the relative position of the matching portion 602 in each image to determine an offset in each image, which corresponds to a determined amount of lateral translation 612. Based on the amount of lateral translation, a mapping or registration algorithm can utilize the amount of lateral translation, as determined using the image information from the "bottom" camera, to determine an approximate amount of translation to apply to the images 514, 516 that were captured using the primary camera. In some embodiments, a proximity sensor or similar distance determination mechanism can be used to determine an approximate distance to an object in the primary image, to attempt to determine a corresponding amount of image translation in response to the determined amount of device translation. Various orientation-based mapping techniques can be applied once sufficient position and/or orientation information is obtained as known in the art, which will not be discussed herein in detail.

Figure 7A:
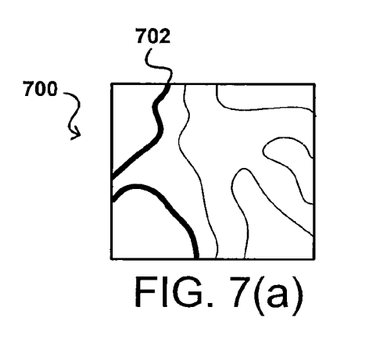
FIGS. 7(a) and (b) illustrate example images showing correlatable features in images captured of carpet that can be used to correlate mapping images in accordance with various embodiments.
Figure 7B:
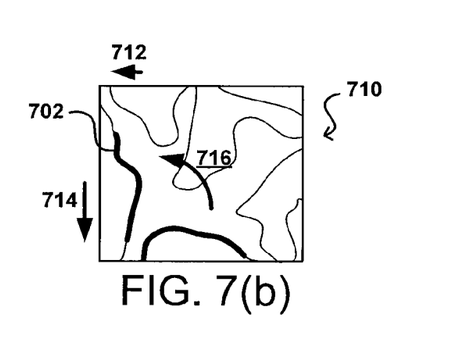

Similarly, FIG. 7(a) illustrates a similar view of the pattern in a first captured image 700, and a different view in a second image 710. As can be seen, the second image 710 still contains the common portion of the pattern 702, but in this case there has been an amount of rotation 716 in addition to, or in place of, at least one amount of translation 712, 714. As discussed with respect to FIG. 6(b), the determined amount of translation and/or rotation of the device can be used to determine an amount of translation to be applied when determining the amount of overlap in the images 514, 516 captured using the primary camera, as may be further based on distance determinations, etc.

In some embodiments, approximate geographical information for objects in the image information is not determined, but the location and/or direction from which the image information was captured. In such a location, information such as the distance to the floor (actual or approximated) can be combined with the amount of rotation and/or translation to determine an approximate location and/or direction at which each primary image is captured, in order to provide that image to a subsequent user attempting to view image information for that approximate location and/or direction.

Figures 8, 9, 10A, 10B:
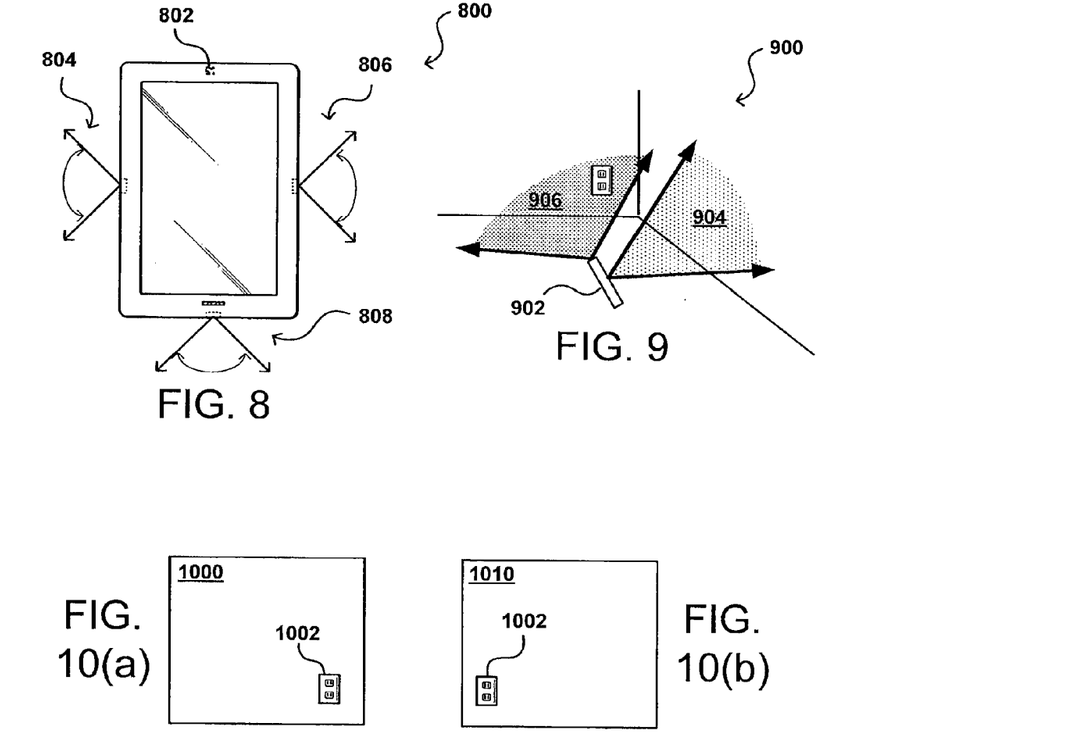

FIG. 8 illustrates another example computing device 800 that can be used to perform location mapping or other such functionality in accordance with various embodiments. In this example, the computing device 800 has two cameras 804, 806 on edges of the device in addition to a back-facing camera 802 and a downward-facing camera 808, each with a different viewing angle capable of capturing image information from a primarily different direction. It should be understood, however, that the back and/or downward facing camera might not be included in other embodiments, there might be additional or fewer cameras in other locations, or there might be similar or alternative imaging elements in other embodiments, among other possible variations. Further, in some embodiments a device with top and bottom cameras can be utilized as a device with two side cameras simply by changing the orientation of the device, which might be automatically detected using at least one orientation-determining element of the computing device.

Figure 11A:
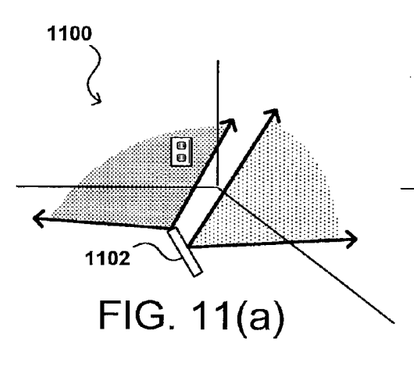
FIGS. 11(a) and (b) illustrate a possible movement of device when using only a single secondary camera to attempt to determine device movement between image capture in accordance with various embodiments.
Figure 11B:
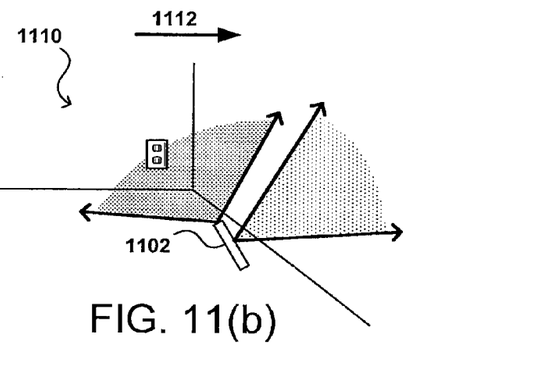

As discussed previously, image information from multiple imaging elements can be used to increase the accuracy of image registration, device orientation determination, and other such aspects. As illustrated in the situation 900 of FIG. 9, a computing device 902 (shown in top view) might have a primary imaging element with a first angular capture range 904 and a second imaging element with a second angular capture range 906. In this example, the primary imaging element will capture image information of a substantially blank wall, which will not have any sufficiently distinguishing features. The secondary camera, however, has within an angular capture range at least one distinguishing feature, here an electrical outlet. FIG. 10(a) illustrates a first image 1000 captured by the secondary camera at a first location and/or orientation, which includes the outlet 1002 at a first position in the first image. FIG. 10(b) illustrates a second image 1010 wherein the outlet 1002 is shown at a second location. By determining the change in relative location of the outlet between the two images, a determination can be made as to a relative change in orientation of the device. For example, the change could result from a translation as illustrated in the situations 1100, 1110 of FIGS. 11(a) and 11(b), wherein the device 1102 was translated by a particular amount 1112, causing a corresponding translation of the outlet in the images captured by the side camera. The determined translation can be used to determine a relative change in the location of the images captured by the primary camera.

Figure 12A:
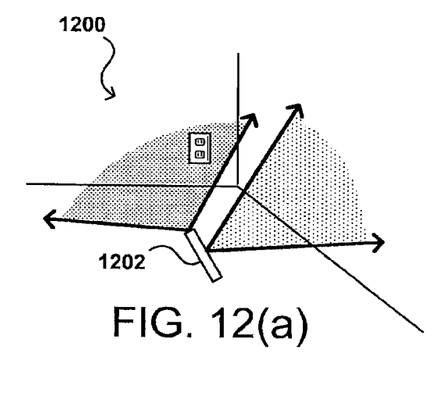
FIGS. 12(a) and (b) illustrate example images showing correlatable features in images captured by cameras of a computing device in accordance with various embodiments.
Figure 12B:
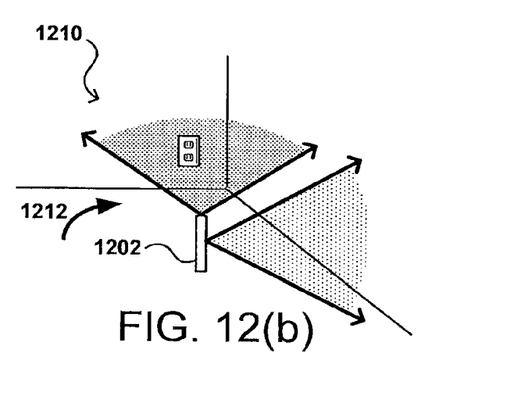

It should be apparent to one of ordinary skill in the art reading the present disclosure, however, that a translation of an object in a subsequent image need not correspond directly to a translation of the capturing element. For example, consider the situations 1200, 1210 illustrated in FIGS. 12(a) and 12(b). In this situation, the movement of the device would again cause the outlet to move to the left in relative position between the first and second images. In this case, however, the change in position of the outlet is not due to a lateral translation, but an amount of rotation 1212 of the computing device 1202. While in some embodiments the change in shape of the imaged feature can provide some indication of whether the movement was a rotation or translation, features such as nail holes or pieces of dirt might not provide a sufficient amount of information to make such a determination.

Figure 13A:
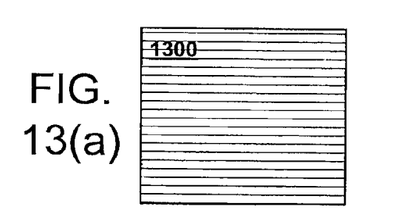
FIGS. 13(a) and (b) illustrate a possible movement of device when using multiple secondary cameras to attempt to determine device movement between image capture in accordance with various embodiments.
Figure 13B:
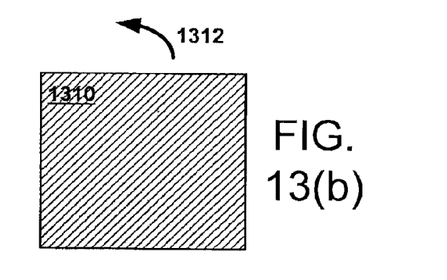

Thus, approaches in accordance with various embodiments can use additional sources of input to attempt to determine rotations versus translations, and various combinations thereof. For example, FIGS. 13(a) and 13(b) illustrate images that might be captured using a downward-facing camera. As illustrated, an amount of rotation 1312 can be seen in the pattern between the first image 1300 and the second image 1310. In this example, there is not a distinct feature that can be used to make an absolute determination as to translation versus rotation. The change in orientation of the pattern, however, can be sufficient to determine an amount of rotation of the device between images, as a 45 degree counterclockwise might have an overlap but a 225 degree counterclockwise rotation, while possible from the pattern, is unlikely as there would be no overlap between the images for conventional imaging elements. Thus, by combining information from additional cameras, the information can be combined to provide a more accurate determination of changes in device orientation, which can then provide a more accurate determination of the overlap of images captured using at least one primary imaging element.

Figure 14A:
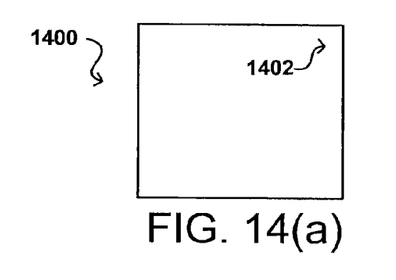
FIGS. 14(a) and (b) illustrate an improvement in image registration that can be provided when using an orientation or position determining element in accordance with various embodiments.
Figure 14B:
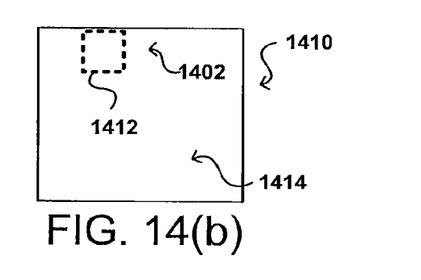

In some embodiments, an orientation- or position-determining element can be used to assist in interpreting motion in at least one secondary camera. For example, an accelerometer or inertial sensor might not be accurate enough to provide precise orientation determinations over time (without drift, calibration, etc.), but might be accurate enough to provide information useful in interpreting the captured image information. For example, an inertial sensor would be able to determine whether the device underwent a lateral translation between image capture, as in FIGS. 11(a) and 11(b), or a rotation as in FIGS. 12(a) and 12(b). Such a sensor can also be used in other embodiments to help improve the accuracy and/or reduce the processing needed for a registration or pattern matching algorithm. For example, FIG. 14(a) illustrates a captured image 1400 that includes a few features that are not sufficiently distinguishable from each other. If the position of each feature is determined, and an approximate amount of device movement can be determined using an accelerometer, inertial sensor, electronic gyroscope, or other such element, the device can determine an approximate region 1412 in a second image in which a feature 1402 in the first image would appear in the second image 1410. In this example, there is another similar feature 1414 in the second image, but based upon the determined amount of movement, that feature 1414 can be distinguished from the feature 1402 in the first image. In at least some embodiments, the size of the predicted region 1412 can depend at least in part upon an amount of determined or predicted error in the orientation determinations, etc. Such an approach can help to match features that otherwise might not be distinguishable. Further, if an algorithm can find a match while only processing image data in the relatively small region 1412, instead of the full second image 1410, the amount of processing can be significantly reduced, which can be particularly beneficial for portable and mobile devices that might have limited processing capability and/or battery life.

Figure 15:
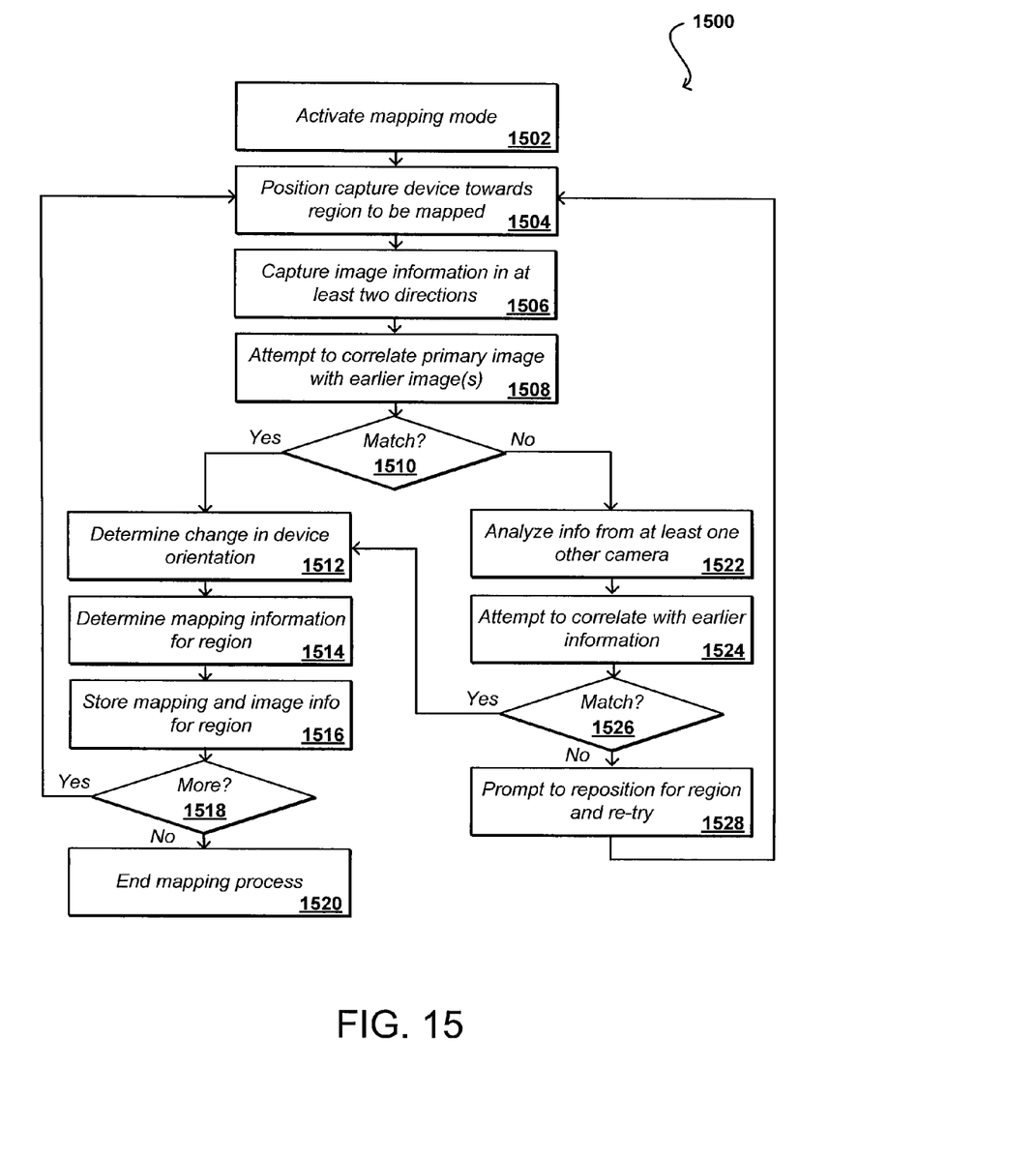
FIG. 15 illustrates an example process for registering images in a mapping process that can be used in accordance with various embodiments.

FIG. 15 illustrates an example process 1500 for mapping a location using a portable computing device that can be utilized in accordance with various embodiments. It should be understood, however, that there can be additional, fewer, or alternative steps performed in similar or alternative orders, or in parallel, within the scope of the various embodiments unless otherwise stated. In this example process, a mapping or image registration mode is activated on the computing device 1502. The mode can be activated manually by a user, automatically upon execution of an associated application, etc. Once the mode is activated and the user is in a location that the user wants to map, the user can position at least one image capture element of a computing device towards a region that is to be included in the mapping 1504. In a building, for example, the user might want to start at a region that corresponds to a reasonable starting point, such as a corner of a room, an entry way door, etc. The user in this embodiment can then cause the device to capture image information in at least two directions 1506, which can correspond to a single input by the user causing multiple image capture elements to concurrently capture image information at the current orientation of the computing device.

If image information has only been captured at a first location, the user can move the device to a second location where there is at least partial overlap and capture similar information for a second region of the location. Once image information has been captured for at least two locations, the process can attempt to correlate the image information for the most recent location with the image information captured for (at least) the most recent previous location 1508, or another set of images at a nearby location if the user is back near a starting point, etc. As discussed, correlating can involve at least comparing the primary images at each location and attempting to determine at least one unique feature present in each image that enables those primary images to be correlated by offset of the feature position. If there is no such match 1510, information from at least one other camera for those locations can be analyzed 1522 to attempt to correlate information for one or more of those cameras with information captured at a previous time and/or location 1524. As discussed, this can involve determining an amount of translation and/or rotation of the computing device between image capture times based at least in part upon the image information captured by at least one other imaging element. If a match still cannot be found 1526, the device can take an appropriate action such as to prompt the user to retry the most recent image capture to attempt to locate a correlatable feature. In some embodiments, the device can prompt the user to take the image from a slightly different location or angle, to improve the likelihood of a match.

If a match is found from the primary and/or secondary image information 1510, 1526, the change in device orientation (including any positional changes) can be determined 1512, and any relevant mapping information for that location can be determined 1514, such as may include an approximate GPS location, distance from a prior location, room information, and the like. The image information, image correlation data, mapping information, position and direction information, and/or any other appropriate information then can be stored for the corresponding region 1516. If there are no more regions to map 1518, the mapping process can end 1520. Otherwise, the user can move to the next location and capture image information to be mapped. The process can continue until all appropriate regions have been imaged and correlated, etc.

Figure 16:
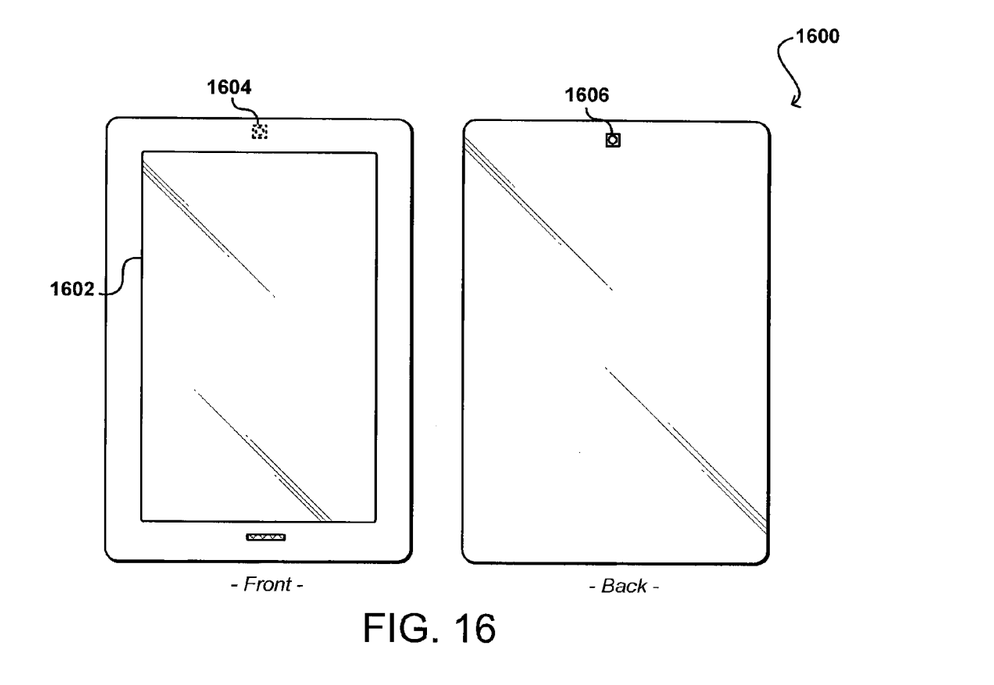
FIG. 16 illustrates front and back views of an example device that can be used in accordance with various embodiments.

FIG. 16 illustrates an example of a computing device 1600 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1600 has a display screen 1602, which under normal operation will display information to a user facing the display screen (e.g., on the same side of the computing device as the display screen). The computing device in this example can include one or more image capture elements, in this example including one image capture element 1604 on the back side of the device, although it should be understood that image capture elements could also, or alternatively, be placed on the sides or corners of the device, and that there can be any appropriate number of capture elements of similar or different types. Each image capture element 1604 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 17:
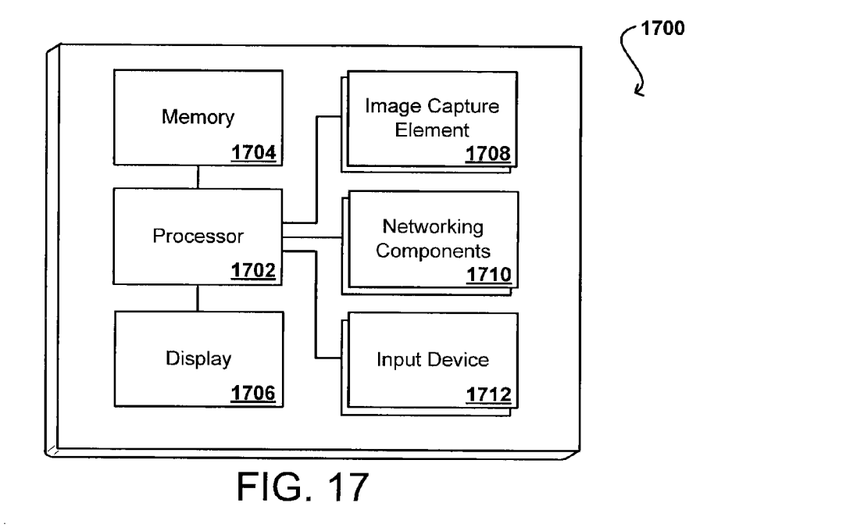
FIG. 17 illustrates an example configuration of components of a device such as that described with respect to FIG. 16.

FIG. 17 illustrates a set of basic components of a computing device 1700 such as the device 1600 described with respect to FIG. 16. In this example, the device includes at least one processor 1702 for executing instructions that can be stored in a memory device or element 1704. As would be apparent to one of ordinary skill in the art, the device can include many types of memory, data storage or computer-readable media, such as a first data storage for program instructions for execution by the processor 1702, the same or separate storage can be used for images or data, a removable memory can be available for sharing information with other devices, and any number of communication approaches can be available for sharing with other devices. The device typically will include some type of display element 1706, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1708, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1710 enabling the device to communicate with remote systems or services such as content providers and rights determining systems. These components can include, for example, wired or wireless communication components operable to communicate over a network such as a cellular network, local area network, or the Internet. The device can also include at least one additional input device 1712 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 18:
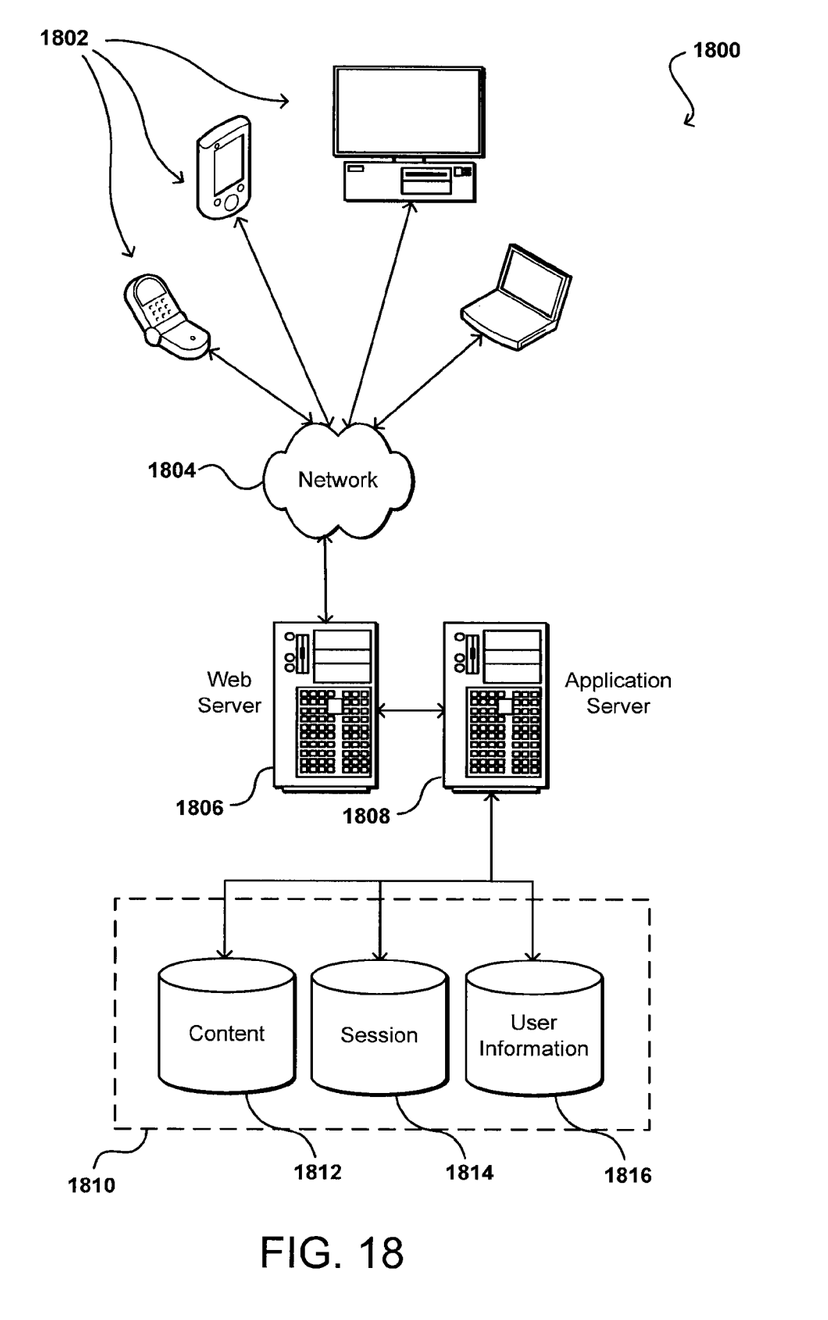
FIG. 18 illustrates an example environment in which various aspects of the various embodiments can be implemented.

As discussed, different approaches can be implemented in various environments in accordance with the described embodiments. For example, FIG. 18 illustrates an example of an environment 1800 for implementing aspects in accordance with various embodiments. As will be appreciated, although a Web-based environment is used for purposes of explanation, different environments may be used, as appropriate, to implement various embodiments. The system includes an electronic client device 1802, which can include any appropriate device operable to send and receive requests, messages or information over an appropriate network 1804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1806 for receiving requests and serving content in response thereto, although for other networks, an alternative device serving a similar purpose could be used, as would be apparent to one of ordinary skill in the art.

The illustrative environment includes at least one application server 1808 and a data store 1810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1808 can include any appropriate hardware and software for integrating with the data store 1810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1806 in the form of HTML, XML or another appropriate structured language in this example. The handling of all requests and responses, as well as the delivery of content between the client device 1802 and the application server 1808, can be handled by the Web server 1806. It should be understood that the Web and application servers are not required and are merely example components, as structured code discussed herein can be executed on any appropriate device or host machine as discussed elsewhere herein.

The data store 1810 can include several separate data tables, databases or other data storage mechanisms and media for storing data relating to a particular aspect. For example, the data store illustrated includes mechanisms for storing content (e.g., production data) 1812 and user information 1816, which can be used to serve content for the production side. The data store is also shown to include a mechanism for storing log or session data 1814. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for registering a set of images, comprising:
    capturing, with a primary imaging element of a device, primary image data at a first time and at a first position of the device;
    capturing, with the primary imaging element, second primary image data at a second time and at a second position of the device, a first field of view of the primary imaging element at the first time at least partially overlapping a second field of view of the primary imaging element at the second time;
    capturing, with the primary imaging element, third primary image data at a third time and at a third position of the device, the first field of view of the primary imaging element at the first time at least partially overlapping a third field of view of the primary imaging element at the third time;
    determining a common feature represented by the first primary image data;
    selecting as registration image data one of the second primary image data, or the third primary image data based at least in part on a first movement between a first relative position of the common feature in the first primary image data and a second relative position of the common feature in the second primary image data; and
    storing registration information enabling the first primary image data and the registration image data to be used to generate a three-dimensional representation of an area around the device.

2. The computer-implemented method of claim 1, further comprising:
    capturing, with a secondary imaging element of the device having a different image capture area than the primary imaging element, first secondary image data at the first time and at the first position;
    capturing, with the secondary imaging element, second secondary image data at the second time and at the second position; and
    capturing, with the secondary imaging element, third secondary image data at the third time and at the third position.

3. The computer-implemented method of claim 2, further comprising:
    sending the first primary image data and the first secondary image data to a remote server for analysis.

4. The computer-implemented method of claim 1, further comprising:
    determining a relative change in orientation of the device between the first time and the second time using at least one orientation determining element,
    wherein selecting as the registration image data one of the second primary image data, or the third primary image data is further based at least in part on the relative change in orientation.

5. The computer-implemented method of claim 1, further comprising determining the registration information based at least in part upon an amount and direction of overlap between the first primary image data and the registration image data.

6. The computer-implemented method of claim 1, further comprising determining with at least a minimum level of confidence that the common feature is represented in at least one of the second primary image data and the third primary image data.

7. The computer-implemented method of claim 1, further comprising:
    prompting a user of the device to capture fourth primary image data.

8. The computer-implemented method of claim 1, further comprising:
    capturing, at the first position, distance information between the device and at least one object; and
    using the distance information with the first primary image data and the registration image data to generate a three-dimensional mapping of an area around the device.

9. A computing device, comprising:
    a processor;
    at least one primary imaging element oriented in a primary image capture direction; and
    memory storing instructions, that when executed by the processor, cause the computing device to:
        capture, with the primary imaging element, primary image data at a first time and at a first position of the device;
        capture, with the primary imaging element, second primary image data at a second time and at a second position of the device, a first field of view of the primary imaging element at the first time at least partially overlapping a second field of view of the primary imaging element at the second time;
        capture, with the primary imaging element, third primary image data at a third time and at a third position of the device, the first field of view of the primary imaging element at the first time at least partially overlapping a third field of view of the primary imaging element at the third time;
        determine a common feature represented by the first primary image data;
        select as registration image data one of the second primary image data, or the third primary image data based at least in part on a first movement between a first relative position of the common feature in the first primary image data and a second relative position of the common feature in the second primary image data; and store registration information enabling the first primary image data and the registration image data to be used to generate a three-dimensional representation of an area around the device.

10. The computing device of claim 9, further comprising:
a first secondary imaging element having a different image capture area than the primary imaging element,
the instructions that, when executed by the processor, further cause the computing device to:
capture, with the first secondary imaging element, first secondary image data at the first time and at the first position;
capture, with the first secondary imaging element, second secondary image data at the second time and at the second position; and
capture, with the first secondary imaging element, third secondary image data at the third time and at the third position.

11. The computing device of claim 10, the instructions that, when executed by the processor, further cause the computing device to:
send the first primary image data and the first secondary image data to a remote server for analysis.

12. The computing device of claim 10, further comprising:
a second secondary imaging element on a second edge of the device;
wherein the first secondary imaging element is on a first edge of the device;
the instructions that, when executed by the processor, further cause the computing device to:
capture, with the second secondary imaging element, a fourth secondary image at the first time and at the first position;
capture, with the second secondary imaging element, a fifth secondary image at the second time and at the second position; and
capture, with the second secondary imaging element, a sixth secondary image at the third time and at the third position.

13. The computing device of claim 9, further comprising:
a secondary imaging element,
wherein the primary imaging element has at least one of a greater resolution, a lower field of view, and a substantially different image capture direction than the secondary imaging element.

14. The computing device of claim 9, claim further comprising:
a secondary imaging element,
wherein the secondary imaging element is positioned to provide for stereo imaging.

15. The computing device of claim 9, further comprising:
a secondary imaging element,
wherein the primary imaging element and the secondary imaging element include at least one of a digital still camera, a digital video camera, and an infrared sensor.

16. The computing device of claim 9, further comprising:
an orientation determining element;
the instructions that, when executed by the processor, further cause the computing device to:
determine a relative change in orientation of the device between the first time and the second time using at least the orientation determining element,
wherein selecting as the registration image data one of the second primary image data, or the third primary image data is further based at least in part on the relative change in orientation.

17. The computing device of claim 9, the instructions that, when executed by the processor, further cause the computing device to:
determine the registration information based at least in part upon an amount and direction of overlap between the first primary image data and the registration image data.

18. The computing device of claim 9, the instructions that, when executed by the processor, further cause the computing device to:
determine with at least a minimum level of confidence that the common feature is represented in at least one of the second primary image data and the third primary image data.

19. The computing device of claim 9, the instructions that, when executed by the processor, further cause the computing device to:
prompt a user of the device to capture fourth primary image data.

20. The computing device of claim 9, the instructions that, when executed by the processor, further cause the computing device to:
capture, at the first position, distance information between the device and at least one object; and
use the distance information with the first primary image data and the registration image data to generate a three-dimensional mapping of an area around the device.

* * * * *